US012779405B2

(12) United States Patent
Wang et al.

(10) Patent No.: US 12,779,405 B2
(45) Date of Patent: Nov. 3, 2026

(54) METHOD OF PREPARING POLYAMIDE MEMBRANE WITH MULTI-LEVEL PORE STRUCTURE MEDIATED BY PROTEIN FIBER NETWORK

(71) Applicant: Harbin Institute of Technology, Harbin City (CN)

(72) Inventors: Panpan Wang, Harbin (CN); Zhilin Zhang, Harbin (CN); Jun Ma, Harbin (CN); Mansheng Chen, Harbin (CN); Yajuan Cai, Harbin (CN); Shiyi Qiu, Harbin (CN)

( * ) Notice: Subject to any disclaimer, the term of this patent is extended or adjusted under 35 U.S.C. 154(b) by 0 days.

(21) Appl. No.: 19/304,517

(22) Filed: Aug. 19, 2025

(65) Prior Publication Data

US 2026/0048364 A1 Feb. 19, 2026

(30) Foreign Application Priority Data

Aug. 19, 2024 (CN) ......................... 202411137575.8

(51) Int. Cl.

| | |
|---|---|
| ***B01D 69/12*** | (2006.01) |
| ***B01D 61/14*** | (2006.01) |
| ***B01D 67/00*** | (2006.01) |
| ***B01D 69/02*** | (2006.01) |
| ***B01D 69/14*** | (2006.01) |
| ***B01D 71/56*** | (2006.01) |

(52) U.S. Cl.

CPC ....... *B01D 69/1251* (2022.08); *B01D 61/145* (2013.01); *B01D 67/0097* (2013.01); *B01D 69/02* (2013.01); *B01D 69/144* (2013.01); *B01D 71/56* (2013.01); *B01D 2323/081* (2022.08); *B01D 2323/082* (2022.08); *B01D 2323/12* (2013.01); *B01D 2323/46* (2013.01); *B01D 2323/48* (2013.01); *B01D 2325/0281* (2022.08)

(58) Field of Classification Search

CPC ............ B01D 69/1251; B01D 67/0097; B01D 69/02; B01D 69/144; B01D 71/56; B01D 61/145; B01D 2323/081; B01D 2323/082; B01D 2323/12; B01D 2323/46; B01D 2323/48; B01D 2325/0281; B01D 67/0002; B01D 67/0006; B01D 2325/02; B01D 2325/36; B01D 2325/48; C02F 1/442

See application file for complete search history.

(56) References Cited

U.S. PATENT DOCUMENTS

| | | | | |
|---|---|---|---|---|
| 8,231,013 B2 * | 7/2012 | Chu | | A61L 27/56 210/500.21 |
| 2022/0274068 A1 | 9/2022 | Koyuncu et al. | | |
| 2024/0058754 A1 * | 2/2024 | Gan | | B01D 71/56 |

FOREIGN PATENT DOCUMENTS

| | | | | |
|---|---|---|---|---|
| CN | 111330454 A | | 6/2020 | |
| CN | 115948812 A | * | 4/2023 | |
| CN | 117297090 A | * | 12/2023 | A23L 33/105 |
| CN | 117619163 A | | 3/2024 | |
| CN | 118416706 A | | 8/2024 | |
| CN | 105107388 A | | 12/2025 | |

OTHER PUBLICATIONS

Different Types of Pure Water for the Lab: What You Need to Know, Elgalabwater.com (Apr. 28, 2021), https://us.elgalabwater.com/node/162. (Year: 2021).*

* cited by examiner

*Primary Examiner* — William P Fletcher, III

(74) *Attorney, Agent, or Firm* — Novoclaims Patent Services LLC; Mei Lin Wong

(57) ABSTRACT

A method of preparing a polyamide membrane with a multi-level pore structure mediated by a protein fiber network includes the steps of: preparing protein fiber by using protein monomer selected from β-lactoglobulin, lysozyme or bovine serum albumin; quenching and carrying out dialysis; loading protein fiber network on ultrafiltration membrane; preparing aqueous and organic phase solutions; and carrying out interfacial polymerization.

9 Claims, 6 Drawing Sheets

METHOD OF PREPARING POLYAMIDE MEMBRANE WITH MULTI-LEVEL PORE STRUCTURE MEDIATED BY PROTEIN FIBER NETWORK

CROSS REFERENCE OF RELATED APPLICATION

This is a non-provisional application that claims priority to Chinese application number 2024111375758, filing date Aug. 19, 2024, the entire contents of each of which are expressly incorporated herein by reference.

BACKGROUND OF THE PRESENT INVENTION

Field of Invention

The present invention relates to a seawater desalination and wastewater pollution control method.

Description of Related Arts

Membrane separation technology plays a vital role in the field of water treatment due to its high efficiency and environmental friendliness. Nanofiltration membrane, as the core component of this technology, has shown wide application potential in water purification, seawater desalination and wastewater treatment due to its unique pore size selectivity and low operating pressure. Nanofiltration membranes effectively remove dissolved organic matter, hardness components, and specific ions from water through precise screening while maintaining a high water flux. The preparation technology of nanofiltration membranes is constantly improving. Among them, the interfacial polymerization method has become the mainstream due to its strong controllability and simple operation. By forming an ultra-thin polyamide selective layer on the porous base membrane, efficient retention of the target substance can be achieved. However, the traditional interfacial polymerization method still faces challenges in the preparation process, such as insufficient hydrophilicity and low porosity of the base membrane, which leads to uneven distribution of amine monomers, affecting the integrity and separation performance of the polyamide layer, and limiting the further improvement of the separation efficiency and selectivity of nanofiltration membranes.

SUMMARY OF THE PRESENT INVENTION

In order to solve the problems of the integrity and separation performance of the polyamide layer being affected by low porosity of the base membrane and uneven distribution of amine monomers in the existing methods for preparing polyamide membranes, the present invention provides a method of preparing a polyamide membrane with multi-level pore structure mediated by protein fiber network.

In order to overcome the defects of the prior art, the present invention provides “a method for preparing a polyamide membrane with a multi-level pore structure mediated by protein fiber network”. This method significantly improves the hydrophilicity and porosity of the base membrane by constructing a protein fiber network on the porous base membrane, providing a uniform reaction interface for interfacial polymerization, thereby promoting the uniform formation of the polyamide layer and effectively avoiding the defects formation. By precisely controlling the polymerization conditions, the prepared nanofiltration membrane exhibited excellent separation performance, including higher water flux and better salt retention rate. In addition, the introduction of the protein fiber network also enhances the mechanical strength and anti-fouling ability of the membrane, providing a guarantee for the long-term stable operation of the nanofiltration membrane. This innovative method not only improves the performance of nanofiltration membranes, but also provides a new direction for the development of water treatment technology, and is expected to be more widely used in fields such as water purification and sewage treatment.

The present invention optimizes the interfacial polymerization process through a protein fiber network, utilizes the high affinity of the protein fiber network with amine molecules, effectively slows down the diffusion rate of amine monomers, and achieves precise control of the interfacial polymerization reaction to prepare a nanofiltration membrane with a thinner and more uniform polyamide layer. The protein fiber network refers to a network of multiple interweaving protein fibers, formed by vacuum filtration of protein fibers onto the ultrafiltration membrane.

A method for preparing a polyamide membrane with a multi-level pore structure mediated by a protein fiber network includes the following steps:

(1) Preparing protein fiber:

dissolving protein monomer in ultrapure water to obtain a protein solution; placing the protein solution in a refrigerator at a refrigeration temperature for a period of refrigeration time; taking the protein solution out from the refrigerator and adjusting its pH to acidic by using hydrochloric acid; then heating and stirring under an oil bath for a period of heating and stirring time to obtain the protein fibers;

(2) Quenching and dialysis:

removing the protein fibers from the oil bath and immediately placing the container containing the protein fibers in an ice bath to quickly quench the reaction and prevent further assembly; cooling to room temperature and then placing in the refrigerator and using water as a dialysis fluid for dialysis for a period of dialysis time to obtain a protein fiber solution;

(3) Loading a protein fiber network on a ultrafiltration membrane:

rinsing an ultrafiltration membrane several times with deionized water and then soaking in anhydrous ethanol, removing the ultrafiltration membrane from the anhydrous ethanol before use and soaking the ultrafiltration membrane in deionized water; taking the ultrafiltration membrane out from deionized water and pouring the protein fiber solution onto the ultrafiltration membrane, and then performing vacuum filtration to obtain an ultrafiltration membrane loaded with protein fiber network;

(4) Prepare aqueous and organic phase solutions:

(a) dissolving piperazine in water to obtain an aqueous solution;

(b) dissolving Trimesoyl Chloride in an organic solvent, stirring evenly and letting it stand for a period of standing time to obtain an organic phase solution (5) Carrying out interfacial polymerization:

immersing the ultrafiltration membrane loaded with protein fiber network in an aqueous solution for a period of aqueous immersion time and then taking out; hanging the wetted ultrafiltration membrane; after no water droplets can be observed on the surface of the wetted ultrafiltration membrane, immersing the wetted ultrafiltration membrane in an organic phase solution for a period of organic phase immersion time, taking out the wetted ultrafiltration membrane from the organic phase solution after a period of drying time to obtain the polyamide membrane with multi-level pore structure mediated by protein fiber network, and storing in ultrapure water.

The principle of the present invention:

1. The present invention uses protein fibers to construct a network structure with high porosity on the base membrane, which significantly improves the porosity of the base membrane. The high affinity between the protein fiber network and amine molecules enables the modified base membrane to efficiently adsorb and store amine molecules. At the same time, during the interfacial polymerization process, this network structure effectively slows down the release rate of piperazine molecules. This controlled release strategy not only improves the uniformity of the polymerization reaction but also significantly reduces the thickness of the polyamide layer. Compared with conventional nanofiltration membranes, the nanofiltration membrane prepared by the present invention has significantly improved water flux while maintaining high salt retention performance.
2. The nanofiltration membrane prepared by the present invention adopts a unique multi-level pore structure design. The first-level pore structure originates from the protein fiber network itself, providing a large number of fluid transmission channels; the second-level pore structure is a more detailed pore structure formed by the reaction of piperazine (PIP) and Trimesoyl Chloride (TMC) in the pores of the protein fiber network; the third-level pore structure is the dense polyamide selective layer finally formed, which has precise molecular screening capabilities. This multi-level pore structure design not only improves the water flux of the membrane, but also enhances the selectivity of the membrane, achieving efficient separation of solutes of different sizes.
3. The nanofiltration membrane prepared by the present invention has not only a significant improvement in water flux and selectivity, but also has additional structural stability and antibacterial properties. The introduction of the protein fiber network not only enhances the mechanical strength of the membrane, but also gives the membrane material itself good antibacterial properties because of the use of lysozyme with antibacterial properties in the preparation process. This antimicrobial property helps reduce biofouling of the membrane during use, extending the life of the membrane and reducing the need for chemical cleaning. In view of the above characteristics, the nanofiltration membrane prepared by the present invention not only improves the water treatment efficiency, but also provides a guarantee for the long-term stable operation of the membrane.

The advantages of the present invention are as follows:

1. Compared to the nanofiltration membrane prepared by traditional methods, the water flux of the polyamide membrane prepared by the method of the present invention is increased from 17.23 $Lm^{-2}h^{-1}bar^{-1}$ to 30.4 $Lm^{-2}h^{-1}bar^{-1}$, achieving a significant increase in water flux while maintaining the high retention performance of the membrane.
2. After the protein fiber network is introduced into the base membrane, the polyamide layer formed by interfacial polymerization shows a smaller thickness and higher roughness. The formation of this structure is due to the multi-level pore characteristics of the protein fiber network, which provides more active sites for interfacial polymerization, promotes a more uniform polymerization reaction, and thus forms a more uniform polyamide layer.
3. The preparation method used in the present invention provides additional structural stability and anti-fouling properties to the membrane by introducing a protein fiber network. This is of great significance for improving the long-term operation stability of the membrane and reducing the cleaning frequency.

DETAILED DESCRIPTION OF THE PREFERRED EMBODIMENT

Figure 1:
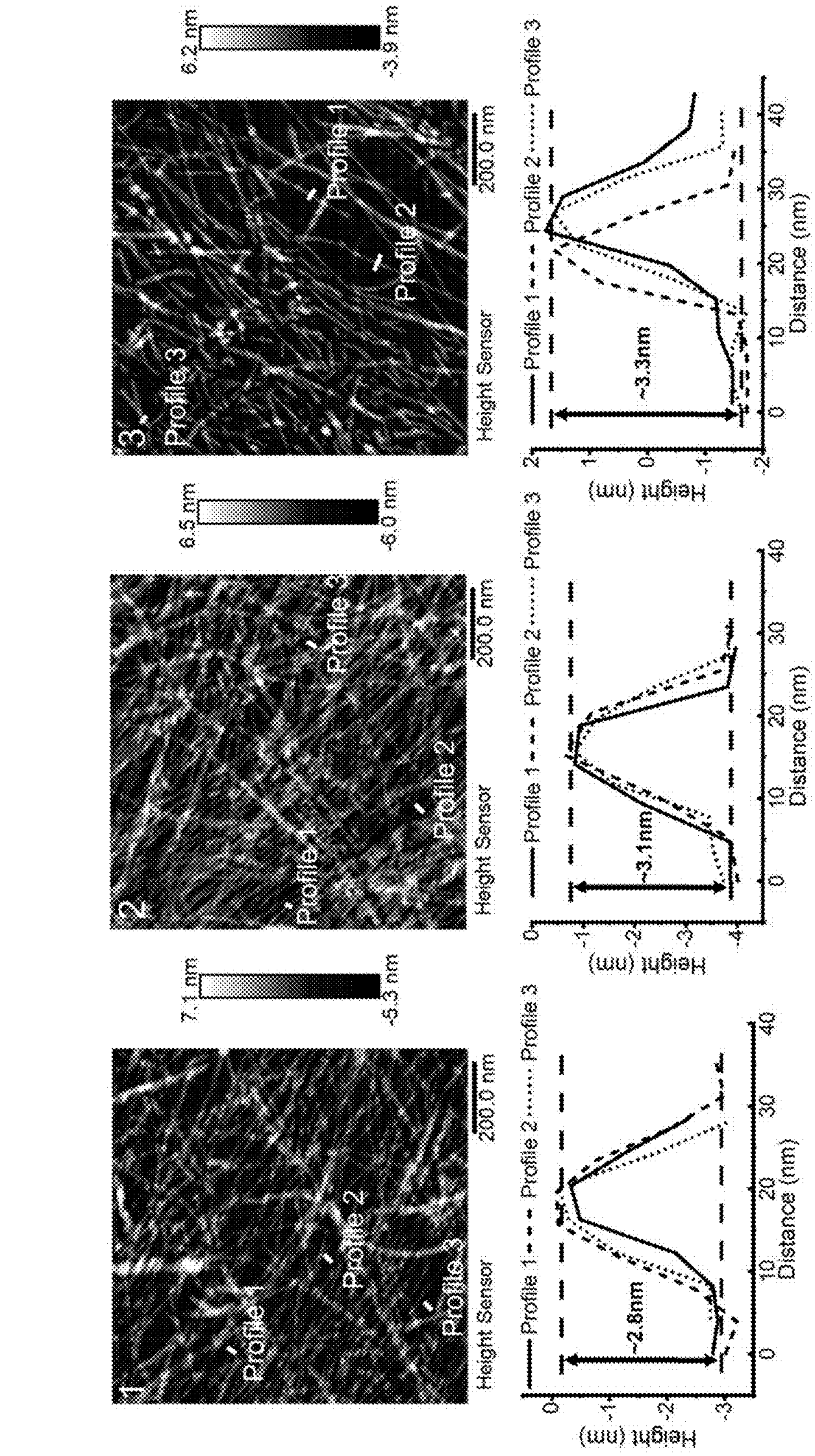
FIG. 1 illustrates the Atomic Force Microscopy (AFM) images of protein fibers prepared in Exemplary Embodiment 1, 6, and 7. The graph below the particular image refers to the corresponding height variation of the underlined area. In this figure, 1, 2 and 3 refers to protein fibers heated for 8 hours (in Exemplary Embodiment 6), 10 hours (in Exemplary Embodiment 1), and 12 hours (in Exemplary Embodiment 7) respectively.

The following examples further illustrate the present invention, but should not be construed as limiting the present invention. Without departing from the essence of the present invention, modifications and substitutions made to the methods, steps or conditions of the present invention are within the scope of the present invention.

Embodiment 1: According to this embodiment, a method for preparing a polyamide membrane with a multi-level pore structure mediated by a protein fiber network includes the following steps:

(1) Preparing protein fiber:

dissolving protein monomer in ultrapure water to obtain a protein solution; placing the protein solution in a refrigerator at a refrigeration temperature for a period of refrigeration time; taking the protein solution out from the refrigerator and adjusting its pH to acidic by using hydrochloric acid; then heating and stirring under an oil bath for a period of heating and stirring time to obtain the protein fibers;

(2) Quenching and dialysis:

removing the protein fibers from the oil bath and immediately placing the container containing the protein fibers in an ice bath to quickly quench the reaction and prevent further assembly; cooling to room temperature and then placing in the refrigerator and using water as a dialysis fluid for dialysis for a period of dialysis time to obtain a protein fiber solution;

(3) Loading a protein fiber network on an ultrafiltration membrane:

rinsing an ultrafiltration membrane several times with deionized water and then soaking in anhydrous ethanol, removing the ultrafiltration membrane from the anhydrous ethanol before use and soaking the ultrafiltration membrane in deionized water; taking the ultrafiltration membrane out from deionized water and pouring the protein fiber solution onto the ultrafiltration membrane, and then performing vacuum filtration to obtain an ultrafiltration membrane loaded with protein fiber network;

(4) Prepare aqueous and organic phase solutions:

(a) dissolving piperazine in water to obtain an aqueous solution;

(b) dissolving Trimesoyl Chloride in an organic solvent, stirring evenly and letting it stand for a period of standing time to obtain an organic phase solution (5) Carrying out interfacial polymerization:

immersing the ultrafiltration membrane loaded with protein fiber network in an aqueous solution for a period of aqueous immersion time and then taking out; hanging the wetted ultrafiltration membrane; after no water droplets can be observed on the surface of the wetted ultrafiltration membrane, immersing the wetted ultrafiltration membrane in an organic phase solution for a period of organic phase immersion time, taking out the wetted ultrafiltration membrane from the organic phase solution after a period of drying time to obtain the polyamide membrane with multi-level pore structure mediated by protein fiber network, and storing in ultrapure water.

Embodiment 2: This embodiment is different from Embodiment 1 in that: in step (1), the protein monomer is β-lactoglobulin, lysozyme or bovine serum albumin; and a mass ratio of the protein monomer to ultrapure water is (0.2~0.4):(20~30). Others are the same as the Embodiment 1.

Embodiment 3: This embodiment is different from Embodiment 1 or 2 in that: in step (1), the refrigeration temperature is 3° C.~4° C., and the refrigeration time is 24 hours~32 hours; and in step (1), the pH of the protein solution is adjusted to 2~3 using hydrochloric acid with a mass fraction of 1 mol/L~5 mol/L. Others are the same as the Embodiment 1 or 2.

Embodiment 4: This embodiment is different from one of Embodiments 1-3 in that: in step (1), the temperature of the oil bath is 80° C.~90° C., a stirring speed is 40 rpm~60 rpm, and the stirring time is 8 hours~24 hours. Others are the same as the Embodiment 1-3.

Embodiment 5: This embodiment is different from one of Embodiments 1-4 in that: in step (2), the dialysis time is 20 hours~30 hours, the dialysis fluid does not need to be replaced during the dialysis; in step (2), a mass fraction of the protein fiber solution is 0.05% to 0.2%. Others are the same as the Embodiment 1-4.

Embodiment 6: This embodiment is different from one of Embodiments 1-5 in that: in step (3), the ultrafiltration membrane is rinsed with deionized water 3 to 4 times; in step (3), the ultrafiltration membrane is soaked in anhydrous ethanol for more than 24 hours. Others are the same as the Embodiment 1-5.

Embodiment 7: This embodiment is different from one of Embodiments 1-6 in that: in step (3), the ultrafiltration membrane is a polyethersulfone membrane, a polysulfone membrane, a polytetrafluoroethylene membrane, a polyvinylidene fluoride membrane, a polyvinylidene fluoride membrane, or a cellulose acetate membrane; a ratio of a volume of the protein fiber solution to a surface area of the ultrafiltration membrane is (10 mL~40 mL):(20 $cm^2$~30 $cm^2$). Others are the same as the Embodiment 1-6.

Embodiment 8: This embodiment is different from one of Embodiments 1-7 in that: in step (4)(a), a mass fraction of the aqueous solution is 0.1%~0.3%; in step (4)(b), a mass fraction of the Trimesoyl Chloride in the organic phase solution is 0.1%~0.5%. Others are the same as the Embodiment 1-7.

Embodiment 9: This embodiment is different from one of Embodiments 1-8 in that: in step (4)(b), the standing time is 0.5 hour~1 hour; the organic solvent is Isopar-G or n-hexane. Others are the same as the Embodiment 1-8.

Embodiment 10: This embodiment is different from one of Embodiments 1-9 in that: in step (5), the immersion time is 5 minutes~10 minutes; and the organic phase immersion time is 30 seconds~60 seconds. Others are the same as the Embodiment 1-9.

The following exemplary embodiments are used to verify the beneficial effects of the present invention:

Exemplary Embodiment 1: According to this exemplary embodiment, a method for preparing a polyamide membrane with a multi-level pore structure mediated by a protein fiber network includes the following steps:

(1) Preparing protein fiber:

dissolving 0.2 g of lysozyme in 20 g of ultrapure water to obtain a protein solution; placing the protein solution in a refrigerator at a refrigeration temperature of 4° C. for a period of refrigeration time of 24 hours; taking the protein solution out from the refrigerator and adjusting its pH to 2 by using 5 mol/L hydrochloric acid; then heating and stirring under an oil bath for a period of heating and stirring time to obtain the protein fibers;

wherein in step (1), the temperature of the oil bath for heating and stirring is 90° C., a stirring speed is 60 rpm, and the heating and stirring time is 10 hours, (2) Quenching and dialysis:

removing the protein fibers from the oil bath and immediately placing the container containing the protein fibers in an ice bath to quickly quench the reaction and prevent further assembly; cooling to room temperature and then using water as a dialysis fluid, and placing in the refrigerator for dialysis for a period of 24 hours to obtain a protein fiber solution, wherein the dialysis fluid does not need to be replaced during the dialysis;

In step (2), a mass fraction of the protein fiber solution is 0.1%.

(3) Loading a protein fiber network on an ultrafiltration membrane:

rinsing an ultrafiltration membrane with deionized water for three times and then soaking in anhydrous ethanol for 24 hours; before use, removing the ultrafiltration membrane from the anhydrous ethanol and soaking the ultrafiltration membrane in deionized water; taking the ultrafiltration membrane out from deionized water and pouring 10 mL protein fiber solution onto the ultrafiltration membrane with a surface area of 20 $cm^2$, then performing vacuum filtration to obtain an ultrafiltration membrane loaded with protein fiber network;

in step (3), the ultrafiltration membrane is polyethersulfone membrane, (4) Preparing aqueous and organic phase solutions:

(a) dissolving piperazine (PIP) in water to obtain an aqueous solution;

in step (4)(a), a mass fraction of the aqueous solution is 0.1%, (b) dissolving Trimesoyl Chloride (TMC) in an organic solvent, stirring evenly and letting it stand for a standing time of one hour to obtain an organic phase solution;

in step (4)(b), the organic solvent is Isopar-G, (5) Carrying out interfacial polymerization:

immersing the ultrafiltration membrane loaded with protein fiber network in the aqueous solution for an aqueous immersion time of 10 minutes and hanging the wetted ultrafiltration membrane until no water droplets can be observed on the surface of the wetted ultrafiltration membrane, then immersing the wetted ultrafiltration membrane in the organic phase solution for an organic phase immersion time of 30 seconds, then taking out the wetted ultrafiltration membrane to obtain the polyamide membrane with multi-level pore structure mediated by protein fiber network, and storing in ultrapure water.

Exemplary Embodiment 2: The difference between this embodiment and the Exemplary Embodiment 1 is that: in step (3), after taking the ultrafiltration membrane out from deionized water, 20 mL protein fiber solution is poured onto the ultrafiltration membrane with a surface area of 20 $cm^2$, then performing vacuum filtration to obtain an ultrafiltration membrane loaded with protein fiber network. Others are the same as the Exemplary Embodiment 1.

Exemplary Embodiment 3: The difference between this embodiment and the Exemplary Embodiment 1 is that: in step (3), after taking the ultrafiltration membrane out from deionized water, 30 mL protein fiber solution is poured onto the ultrafiltration membrane with a surface area of 20 $cm^2$, then performing vacuum filtration to obtain an ultrafiltration membrane loaded with protein fiber network. Others are the same as the Exemplary Embodiment 1.

Exemplary Embodiment 4: The difference between this embodiment and the Exemplary Embodiment 1 is that: in step (3), after taking the ultrafiltration membrane out from deionized water, 40 mL protein fiber solution is poured onto the ultrafiltration membrane with a surface area of 20 $cm^2$, then performing vacuum filtration to obtain an ultrafiltration membrane loaded with protein fiber network. Others are the same as the Exemplary Embodiment 1.

Exemplary Embodiment 5: The difference between this embodiment and the Exemplary Embodiment 1 is that: in step (3), the loading of the protein fibers on the ultrafiltration membrane is omitted, and an unmodified ultrafiltration membrane is directly used for interfacial polymerization. Others are the same as the Exemplary Embodiment 1.

Exemplary Embodiment 6: The difference between this embodiment and the Exemplary Embodiment 1 is that: in step (1), the heating and stirring time is 8 hours. Others are the same as the Exemplary Embodiment 1.

Exemplary Embodiment 7: The difference between this embodiment and the Exemplary Embodiment 1 is that: in step (1), the heating and stirring time is 12 hours. Others are the same as the Exemplary Embodiment 1.

The membranes prepared in Exemplary Embodiments 1-4 are primarily used to investigate the effects of varying protein fiber network thickness and density on the preparation of a polyamide membrane with multi-level pore structure mediated by protein fiber network. Exemplary Embodiment 5 presents a polyamide nanofiltration membrane prepared without a protein fiber network, primarily used for comparison with a polyamide membrane with multi-level pore structure mediated by protein fiber network. Exemplary Embodiment 1, Exemplary Embodiment 6 and Exemplary Embodiment 7 are mainly used to explore the effects of different heating times on the protein fiber structure.

FIG. 1 illustrates the Atomic Force Microscopy (AFM) images of protein fibers prepared in Exemplary Embodiment 1, 6, and 7. The graph below the particular image refers to the corresponding height variation of the underlined area. In this figure, 1, 2 and 3 refers to protein fibers heated for 8 hours (in Exemplary Embodiment 6), 10 hours (in Exemplary Embodiment 1), and 12 hours (in Exemplary Embodiment 7) respectively.

As shown in FIG. 1, the prepared protein fibers are clearly visible, appearing as linear fibers with a length of several microns. As seen from the inset of the FIG. 1, the fiber height gradually increases with increasing heating time, reaching approximately 2.8 nm after 8 hours of heating, 3.1 nm after 10 hours of heating, and 3.3 nm after 12 hours of heating. This indicates that heating time has a certain influence on fiber size. Therefore, heating time can be controlled to prepare different fiber networks, and to prepare a polyamide membrane with multi-level pore structure mediated by protein fiber network.

To more accurately determine the diameter of amyloid fibrils, the fiber diameters in AFM images are measured by using Nanoscope Analysis software. One hundred randomly selected fibers are measured and a distribution diagram is plotted. The numbers in the diagram represent the average diameters.

Figure 2:
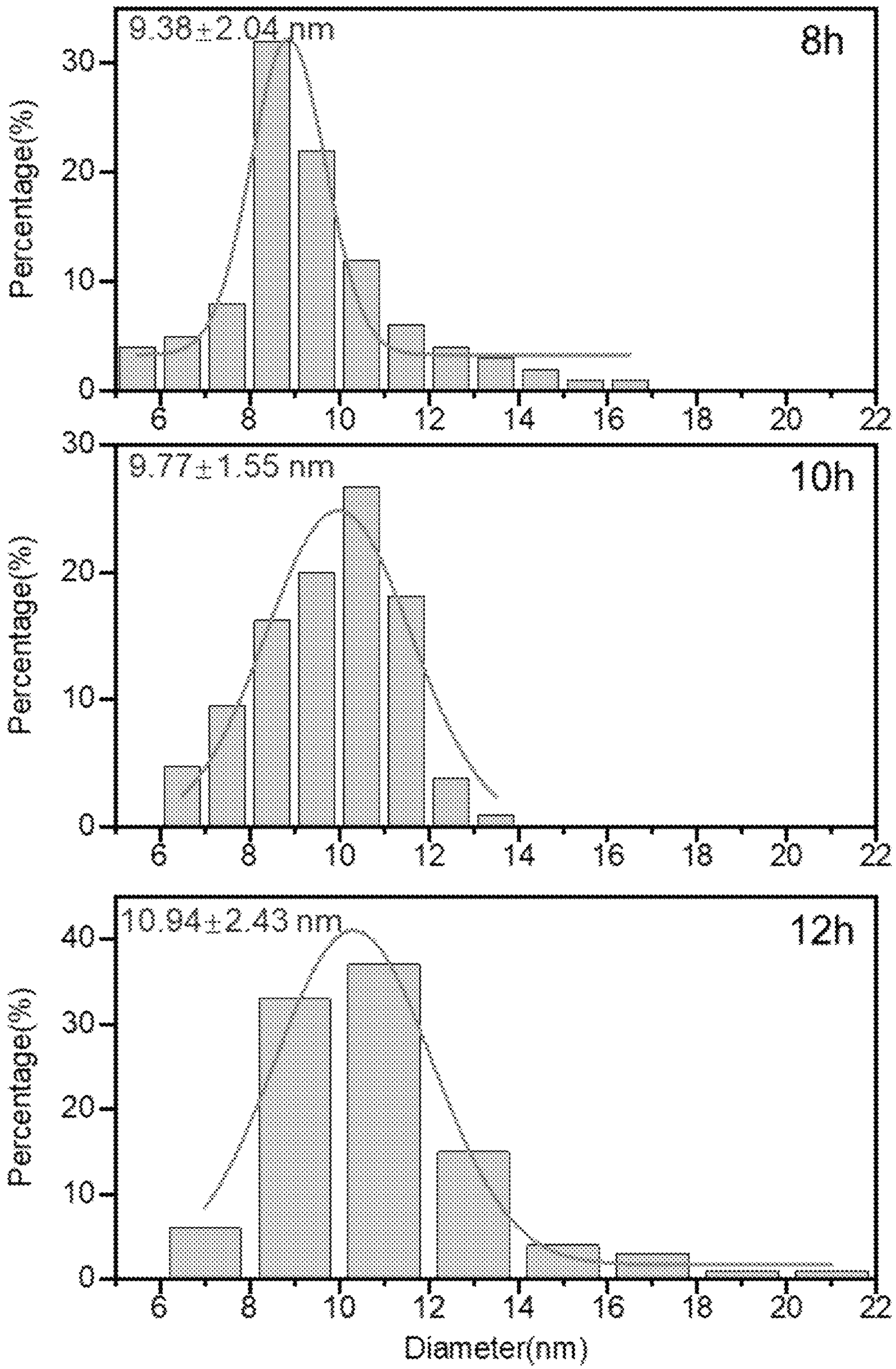
FIG. 2 illustrates the fiber diameters measured by using Nanoscope Analysis software. One hundred (100) randomly selected fibers are measured and a distribution diagram is plotted. The numbers in the diagram represent the average diameters.

FIG. 2 illustrates the fiber diameters measured by using Nanoscope Analysis software. One hundred (100) randomly selected fibers are measured and a distribution diagram is plotted. The numbers in the diagram represent the average diameters.

Referring to FIG. 2, as the heating time increases, the diameter distribution of protein fibers changes from dispersed to more concentrated, indicating that amyloid fibers of various sizes exist when the heating time is short. As the heating time increases, the size of the protein fibers increases and becomes more uniform. As the heating time increases from 8 hours to 10 hours and then to 12 hours, the diameter increases from 9.38±2.04 nm to 9.77±1.55 nm and then to 10.94±2.43 nm.

Figure 3:
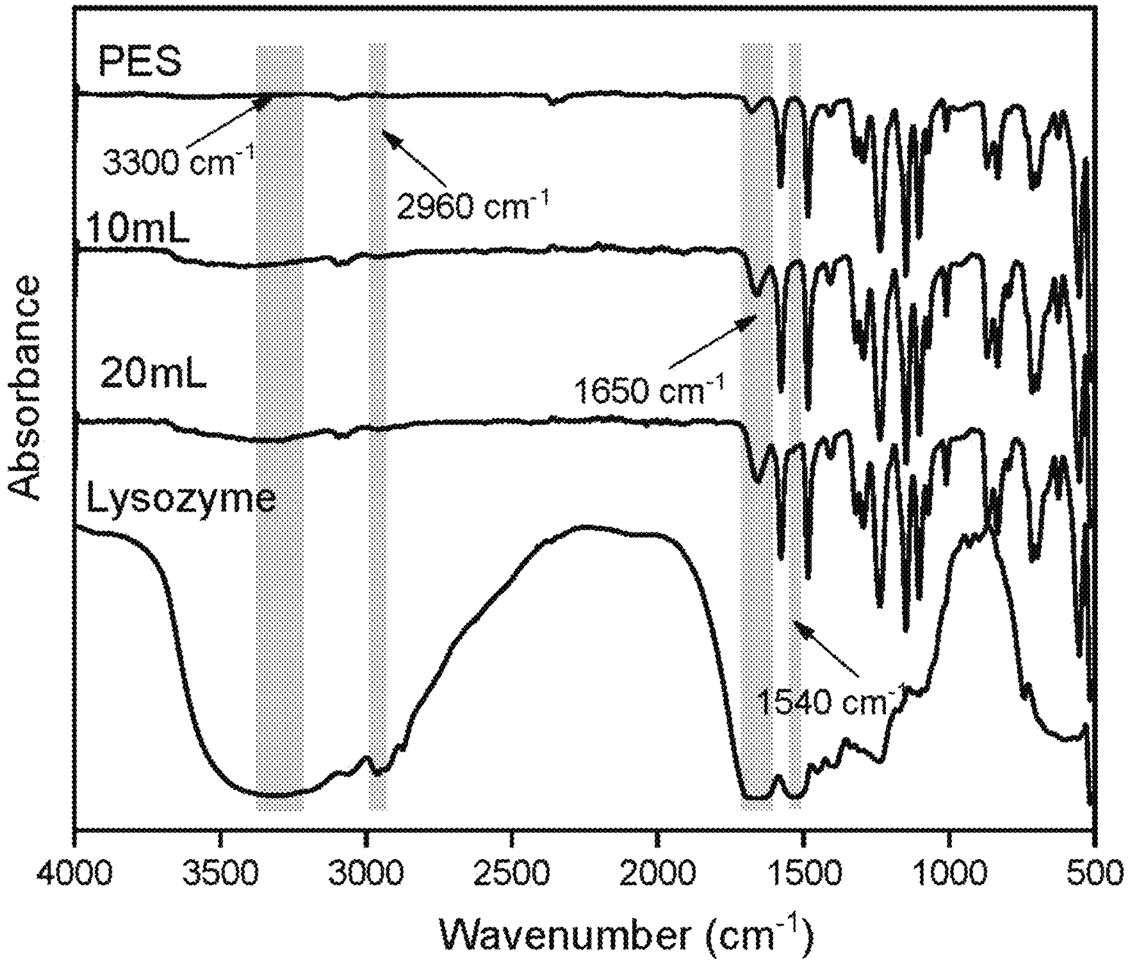
FIG. 3 shows the Fourier transform infrared spectra of the protein fiber network-loaded ultrafiltration membrane prepared after step (3) in Exemplary Embodiment 1 and Exemplary Embodiment 2, the polyethersulfone ultrafiltration membrane, and the lysozyme powder.

Four Fourier transform infrared spectra, including Fourier transform infrared spectra of the protein fiber-loaded ultrafiltration membrane prepared after step 3 of Exemplary Embodiment 1 and Exemplary Embodiment 2, the polyethersulfone ultrafiltration membrane and lysozyme powder, are obtain from infrared testing, as illustrated in FIG. 3.

FIG. 3 shows the Fourier transform infrared spectra of the protein fiber network-loaded ultrafiltration membrane prepared after step 3 in Exemplary Embodiment 1 and Exemplary Embodiment 2, the polyethersulfone ultrafiltration membrane, and the lysozyme powder.

Referring to FIG. 3, the peak intensity at 1650 $cm^{-1}$ gradually becomes stronger with the increase of protein fiber deposition volume, which is caused by the C═O stretching vibration of the peptide bond in the protein; the peak at 2960 $cm^{-1}$ may be related to the aliphatic part of the protein; the peak at 1540 $cm^{-1}$ is caused by peptide bonds in proteins (N—H bending and C—N stretching vibrations); and the broad band centered at 3300 $cm^{-1}$, involving other groups in lysozyme (such as O—H groups), demonstrates the successful loading of the protein fiber network on the ultrafiltration membrane.

Figure 4:
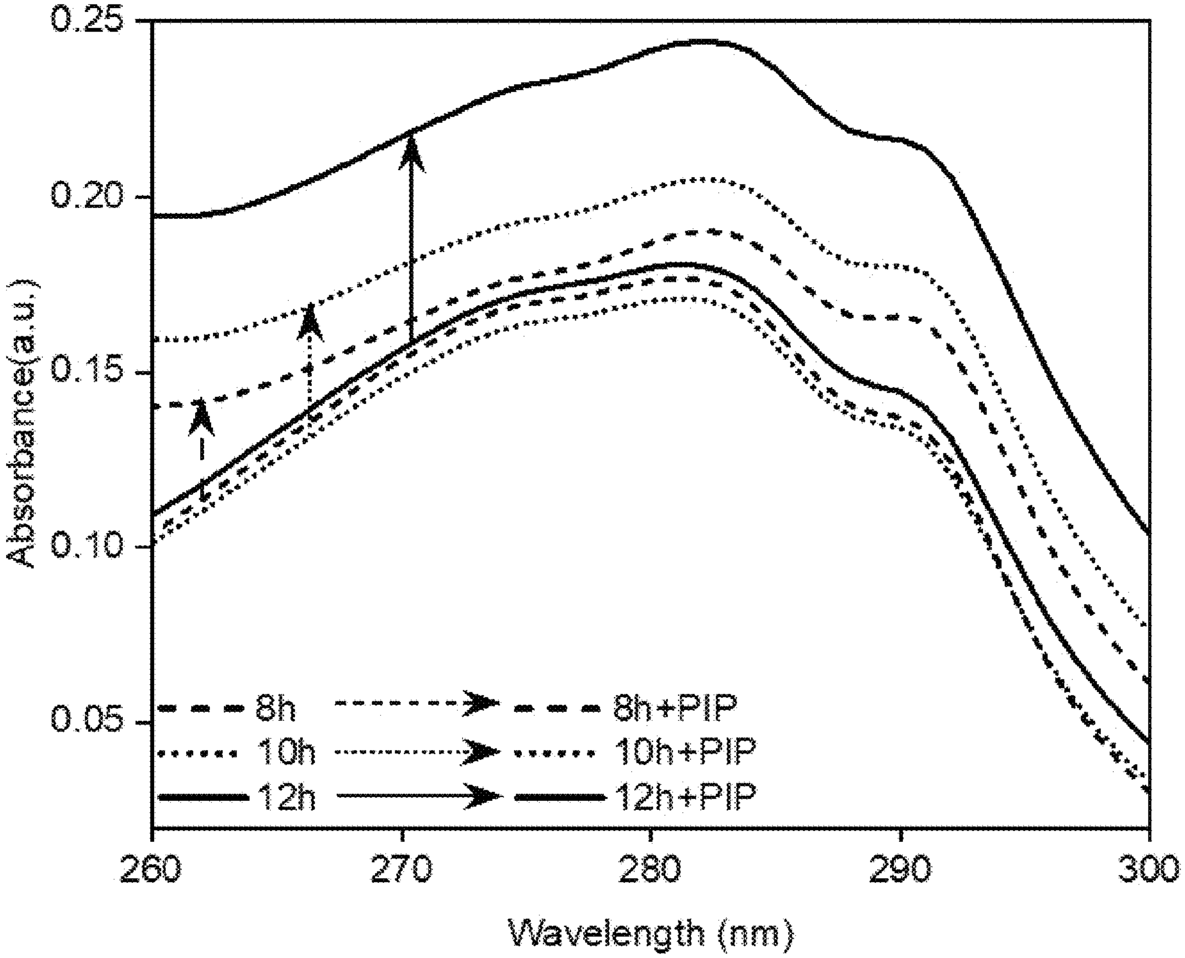
FIG. 4 illustrates the UV spectra of the protein fibers prepared in Exemplary Embodiments 1, 6, and 7, and after adding piperazine. Both measurements are made after dilution with water. The interaction between the protein fibers and piperazine is characterized by peak shifts at wavelengths between 260-300 nm. Different protein fiber samples are represented by different line types. The lines indicated by arrows represent the protein fiber samples after the addition of piperazine. The protein fiber concentration used in the test after dilution is 0.02 wt %, and the piperazine concentration is 0.04 wt %.

FIG. 4 illustrates the UV spectra of the protein fibers prepared in Exemplary Embodiments 1, 6, and 7, and after adding piperazine. Both measurements are made after dilution with water. The interaction between the protein fibers and piperazine is characterized by peak shifts at wavelengths between 260-300 nm. Different protein fiber samples are represented by different line types. The lines indicated by arrows represent the protein fibers samples after the addition of piperazine. The protein fiber concentration used in the test after dilution is 0.02 wt %, and the piperazine concentration is 0.04 wt %.

Referring to FIG. 4, the UV spectrum peak of piperazine is primarily distributed between 200-250 nm. To more accurately demonstrate the interaction between piperazine and protein, analysis is performed at a wavelength of 260-300 nm, where no piperazine peak exists. It can be seen that after adding piperazine (solid line), the peak value of protein fibers is increased significantly, indicating that there is an interaction between piperazine and protein, and as the heating time during preparation increases, the interaction between protein fibers and piperazine gradually increases.

Figure 5:
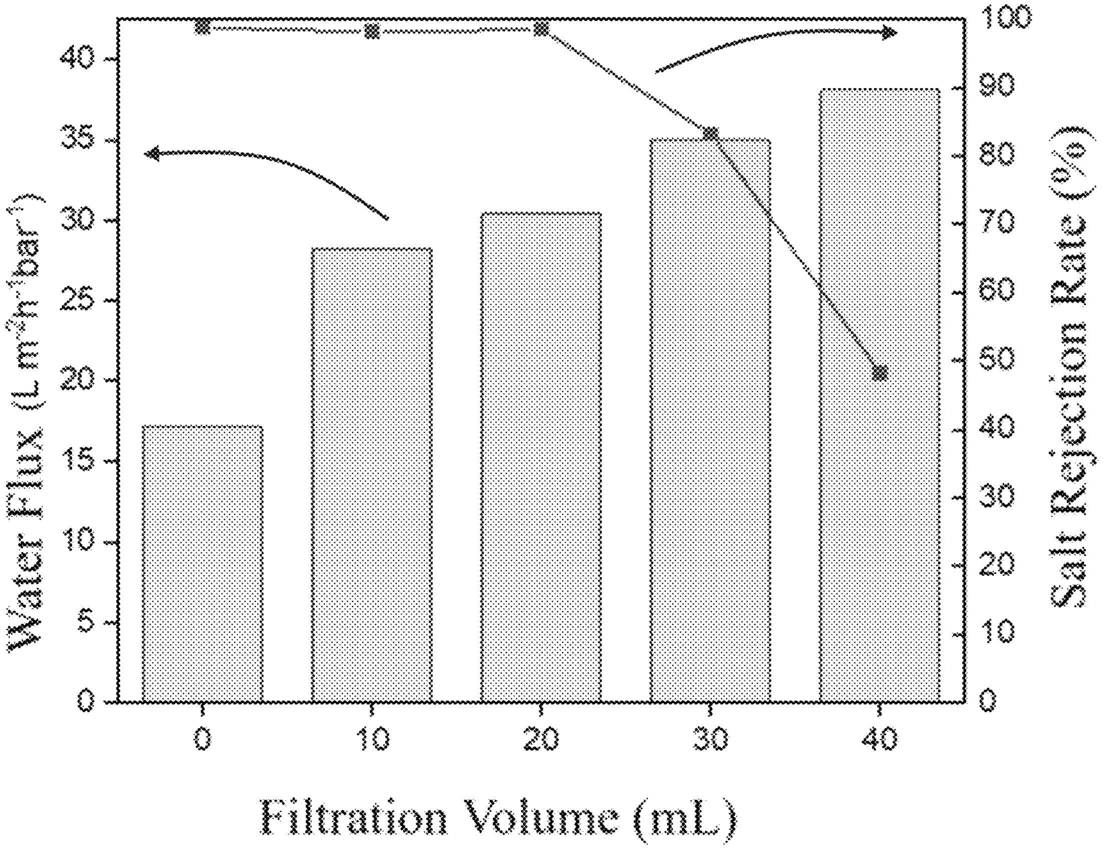
FIG. 5 illustrates the water flux and salt rejection of the membranes prepared in Exemplary Embodiments 1-5. Water flux is measured at 0.4 MPa after a 1-hour pre-pressing at 0.5 MPa. Salt rejection is measured using a 1000 ppm sodium sulfate solution.

FIG. 5 illustrates a comparison of the water flux and salt rejection of the polyamide membrane with multi-level pore structure mediated by protein fiber network prepared in Exemplary Embodiments 1-4 (the horizontal axis corresponds to 10, 20, 30, 40 respectively) and the original polyamide membrane without protein fiber network for interfacial polymerization (the horizontal axis corresponds to 0).

Referring to FIG. 5, with the increase of protein fiber loading on the ultrafiltration membrane, the water flux of the polyamide nanofiltration membrane prepared on this basis gradually increases, which can be attributed to the fact that the protein fiber network structure increases the roughness of the polyamide membrane and provides richer porosity.

When the filtration volume is 30-40 mL, the salt rejection rate decreases, which may be caused by the thicker network structure causing defects in the formed polyamide membrane. Therefore, the filtration volume of 20 mL is selected as the optimal condition. At this optimal condition, the water flux increases from 17.23 $Lm^{-2}h^{-1}bar^{-1}$ to 30.4 $Lm^{-2}h^{-1}bar^{-1}$, achieving a significant increase in water flux while maintaining the high retention performance of the membrane.

Figure 6:
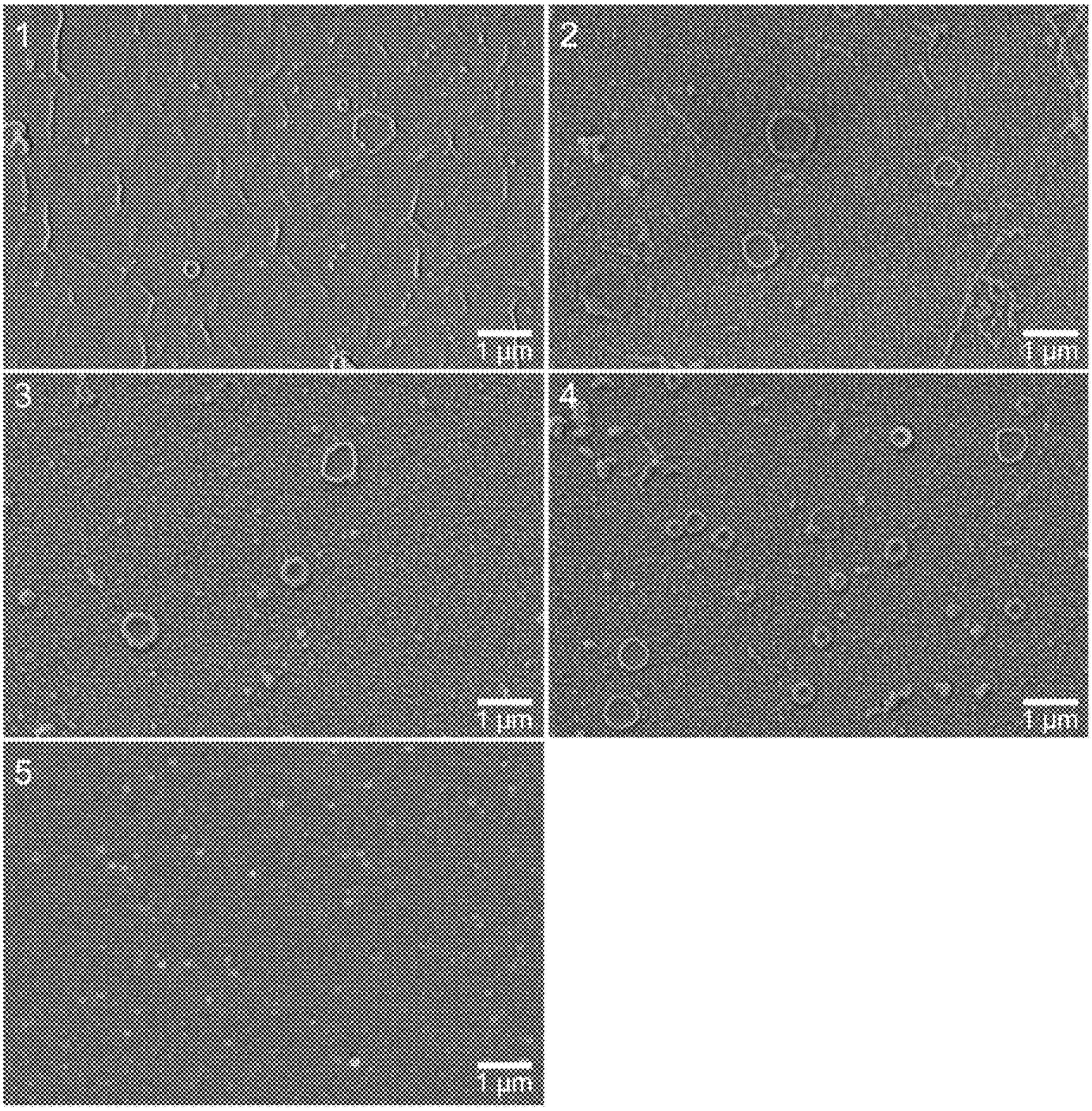
FIG. 6 illustrates the Scanning Electron Microscope (SEM) images of the membranes prepared in Exemplary Embodiments 1 to 5, where 1-5 refers to the images of Exemplary Embodiments 1 to 5 respectively.

As shown in FIG. 6, the surface of the original polyamide membrane without protein fiber network exhibits a typical nodular morphology (No. 5). As the concentration of the protein fiber network deposited on the ultrafiltration membrane increases, stripe-like structures and then ring-like structures sequentially appear on the surface of the prepared polyamide membrane (No. 1 to No. 4). This is because the protein fiber network restricts the diffusion of the aqueous phase amine monomer.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. A method of preparing a polyamide membrane with multi-level pore structure mediated by protein fiber network, comprising the following steps:

(1) preparing protein fiber:

dissolving protein monomer in ultrapure water to obtain a protein solution; placing the protein solution in a refrigerator at a refrigeration temperature for a period of refrigeration time; taking the protein solution out from the refrigerator and adjusting its pH to acidic by using hydrochloric acid; then heating and stirring under an oil bath for a period of heating and stirring time to obtain the protein fibers, wherein in step (1), the protein monomer is β-lactoglobulin, lysozyme or bovine serum albumin; and a mass ratio of the protein monomer to ultrapure water is (0.2~0.4):(20~30);

(2) quenching and dialysis:

removing the protein fibers from the oil bath and immediately placing the container containing the protein fibers in an ice bath to quench the formation of the protein fibers and prevent further assembly; cooling the protein fibers to room temperature and then placing the protein fibers in the refrigerator and using water as a dialysis fluid for dialysis for a period of dialysis time to obtain a protein fiber solution;

(3) loading a protein fiber network on an ultrafiltration membrane:

rinsing an ultrafiltration membrane several times with deionized water and then soaking in anhydrous ethanol; removing the ultrafiltration membrane from the anhydrous ethanol before use and soaking the ultrafiltration membrane in deionized water; taking the ultrafiltration membrane out from the deionized water and pouring the protein fiber solution onto the ultrafiltration membrane; and then performing vacuum filtration to obtain an ultrafiltration membrane loaded with protein fiber network, wherein in step (3), a ratio of a volume of the protein fiber solution to a surface area of the ultrafiltration membrane is (10 mL~40 mL):(20 $cm^2$~30 $cm^2$);

(4) preparing aqueous and organic phase solutions:

(a) dissolving piperazine in water to obtain an aqueous solution;

(b) dissolving trimesoyl chloride in an organic solvent, stirring evenly and letting it stand for a period of standing time to obtain an organic phase solution;

(5) carrying out interfacial polymerization:

immersing the ultrafiltration membrane loaded with protein fiber network in the aqueous phase solution for a period of aqueous immersion time and then taking the ultrafiltration membrane out of the aqueous phase solution; hanging the wetted ultrafiltration membrane; after no water droplets can be observed on the surface of the wetted ultrafiltration membrane, immersing the wetted ultrafiltration membrane in the organic phase solution for a period of organic phase immersion time, taking out the wetted ultrafiltration membrane from the organic phase solution after a period of drying time to obtain the polyamide membrane with multi-level pore structure mediated by protein fiber network, and storing the polyamide membrane with multi-level pore structure mediated by protein fiber network in ultrapure water.

2. The method of preparing a polyamide membrane with multi-level pore structure mediated by a protein fiber network according to claim 1, wherein, in step (1), the refrigeration temperature is 3° C.~4° C., the refrigeration time is 24 hours~32 hours, and the pH of the protein solution is adjusted to 2~3 using hydrochloric acid with a mass fraction of 1 mol/L~5 mol/L.

3. The method of preparing a polyamide membrane with multi-level pore structure mediated by protein fiber network according to claim 1, wherein, in step (1), the temperature of the oil bath is 80° C.~90° C., a stirring speed is 40 rpm~60 rpm, and the stirring time is 8 hours~24 hours.

4. The method of preparing a polyamide membrane with multi-level pore structure mediated by protein fiber network according to claim 1, wherein, in step (2), the dialysis time is 20 hours~30 hours, wherein the dialysis fluid does not need to be replaced during the dialysis and a mass fraction of the protein fiber solution is 0.05% to 0.2%.

5. The method of preparing a polyamide membrane with multi-level pore structure mediated by protein fiber network according to claim 1, wherein, in step (3), the ultrafiltration membrane is rinsed with deionized water 3 to 4 times, and the ultrafiltration membrane is soaked in anhydrous ethanol for more than 24 hours.

6. The method of preparing a polyamide membrane with multi-level pore structure mediated by protein fiber network according to claim 1, wherein, in step (3), the ultrafiltration membrane is a polyethersulfone membrane, a polysulfone membrane, a polytetrafluoroethylene membrane, a polyvinylidene fluoride membrane, or a cellulose acetate membrane.

7. The method of preparing a polyamide membrane with multi-level pore structure mediated by protein fiber network according to claim 1, wherein, in step (4)(a), a mass fraction of the aqueous solution is 0.1%~0.3%, and a mass fraction of the trimesoyl chloride in the organic phase solution is 0.1%~0.5%.

8. The method of preparing a polyamide membrane with multi-level pore structure mediated by protein fiber network according to claim 1, wherein, in step (4)(b), the standing time is 0.5 hour~1 hour, and the organic solvent is isoparaffinic hydrocarbon solvent or n-hexane.

9. The method of preparing a polyamide membrane with multi-level pore structure mediated by protein fiber network according to claim 1, wherein, in step (5), the immersion time is 5 minutes~10 minutes, and the organic phase immersion time is 30 seconds~60 seconds.

* * * * *